Jan. 9, 1940.  E. D. YOUMANS  2,186,441
ELECTRIC CABLE
Filed June 13, 1935

INVENTOR
Edward D. Youmans
BY
Kiddle, Bithell and Montgomery
ATTORNEYS

Patented Jan. 9, 1940

2,186,441

UNITED STATES PATENT OFFICE 2,186,441

ELECTRIC CABLE

Edward D. Youmans, Clifton, N. J., assignor to The Okonite Company, Passaic, N. J., a corporation of New Jersey Application June 13, 1935, Serial No. 26,334

5 Claims. (Cl. 173—244)

This invention is directed to an improved method of making electric cables of the type, for example, shown in my copending application Serial No. 658,521, filed February 25, 1933, wherein I provide a cable insulated with one or more servings of glass roves and encased in a lead or alloy sheath.

In the method of the present invention I first apply the servings of glass to the cable conductor in any convenient fashion, until an insulating wall is built up of materially greater thickness than is desired in the finished cable, and then the assembly is run through a lead press where a metal sheath is extruded about the same, this operation compressing the glass insulation to the wall thickness desired. I find that this method makes an excellent cable, the application of the sheath compressing the glass into a uniformly compact insulating wall.

In the drawing wherein I have illustrated an embodiment of the invention:

Fig. 1 is a cross section through the finished cable; while

Figure 1:
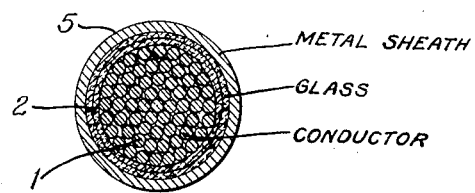
Figure 2:
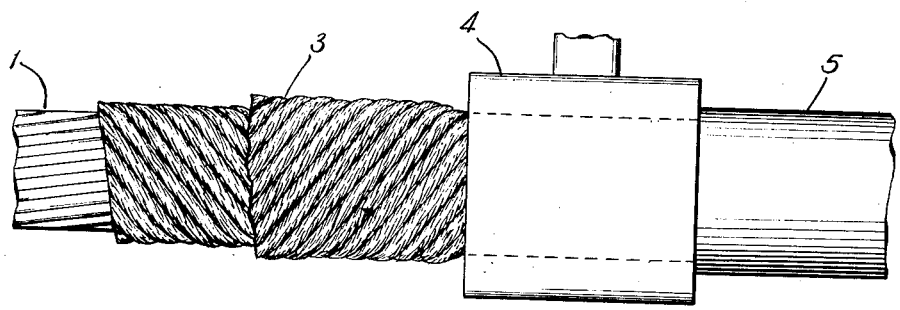
Fig. 2 shows the cable in the process of manufacture.

Referring to the drawing in detail, I designates the cable conductor which may be of the solid or stranded type.

About this conductor I apply a wall of insuation 2, which conveniently is applied in the form of servings 3 of glass roves, for example, it being understood, however, that the glass may be applied simply in wool form if desired, or it may be applied in the form of compressible braids.

The insulating wall at this stage of the process is built up to a thickness materially greater than it is to be finally. I have found it good practice to build up the wall to about twice its eventual thickness.

I then pass the conductor, so insulated, into a lead press, diagrammatically illustrated at 4, the die of which is so set as to extrude a lead or alloy sheath 5 about the glass insulation, having an inside diameter materially less than the original outside diameter of the insulation, thereby compacting and compressing the same to the desired wall thickness. As mentioned above I have obtained good results where the outside diameter of the insulation is reduced to the point where the original wall thickness is reduced one half.

As above mentioned the glass insulation is conveniently applied in the form of a loose serving or servings of glass rovings, but it is to be understood that my invention comprehends applying the insulation in other ways, provided that in extruding the metal sheath about this insulation the wall thickness of the insulation is materially reduced thereby to compact the insulation to the desired density and wall thickness.

What I claim is:

1. In the manufacture of electric cables, the method which comprises applying a compressible fibrous glass layer about the cable conductor and then compacting and compressing the glass layer to eliminate voids therein by enclosing the glass in a metallic sheath having a uniform inside diameter materially less than the initial outside diameter of said layer.

2. In the manufacture of electric cables, the method which comprises applying a compressible glass insulating wall about the conductor of the cable to a thickness about twice that desired in the finished cable, and then extruding a soft metal sheath about this insulation having a uniform inside diameter sufficiently less than the outside diameter of the said insulation as to reduce the wall thickness of the latter by about one half and eliminate voids therein.

3. In the manufacture of electric cables, the method which comprises serving the conductor of the cable with glass roves and then enclosing the roves in a metallic sheath having a uniform inside diameter sufficiently less than the initial outside diameter of the glass roves to compact and compress the roves and eliminate voids therein.

4. In the manufacture of electric cables, the method which comprises applying a compressible layer of glass wool about the cable conductor and then compacting and compressing the glass layer to eliminate voids therein by enclosing the same in a metallic sheath having a uniform inside diameter materially less than the initial outside diameter of said layer.

5. In the manufacture of electric cables, the method which comprises applying compressible glass braid about the cable conductor and then compacting and compressing the glass braid to eliminate voids therein by enclosing the same in a metallic sheath having a uniform diameter materially less than the initial outside diameter of said braid.

EDWARD D. YOUMANS.